United States Patent [19]

Brassell et al.

[11] 4,391,873

[45] Jul. 5, 1983

[54] HIGH TEMPERATURE THERMAL INSULATING COMPOSITE

[75] Inventors: Gilbert W. Brassell, Golden, Colo.; John Lewis, Jr., Oak Ridge, Tenn.

[73] Assignee: The United States of America as represented by the Department of Energy, Washington, D.C.

[21] Appl. No.: 340,623

[22] Filed: Jan. 19, 1982

[51] Int. Cl.$^3$ .................... B29C 25/00; B32B 5/12; C04B 29/00
[52] U.S. Cl. .................... 428/297; 252/62; 264/29.1; 423/447.2; 423/447.4; 428/303; 428/323; 428/338; 428/339; 428/367; 428/401; 428/407; 428/408; 428/920
[58] Field of Search ............... 428/297, 303, 323, 338, 428/339, 367, 407, 408, 401, 920; 252/62; 264/29.1; 423/447.2, 447.4

[56] References Cited

U.S. PATENT DOCUMENTS

| | | | |
|---|---|---|---|
| 3,702,279 | 11/1972 | Ardary et al. | 428/401 |
| 3,793,204 | 2/1974 | Ardary et al. | 428/401 |
| 3,956,564 | 5/1976 | Hillig | 428/367 |
| 4,152,482 | 5/1979 | Reynolds et al. | 428/920 |

*Primary Examiner*—James C. Cannon

[57] ABSTRACT

A composite contains in one region graphite flakes and refractory fibers in carbonized polymeric resin and in an adjacent region a gradually diminishing weight proportion of graphite flakes, refractory fibers, and the same carbonized resin.

7 Claims, 1 Drawing Figure

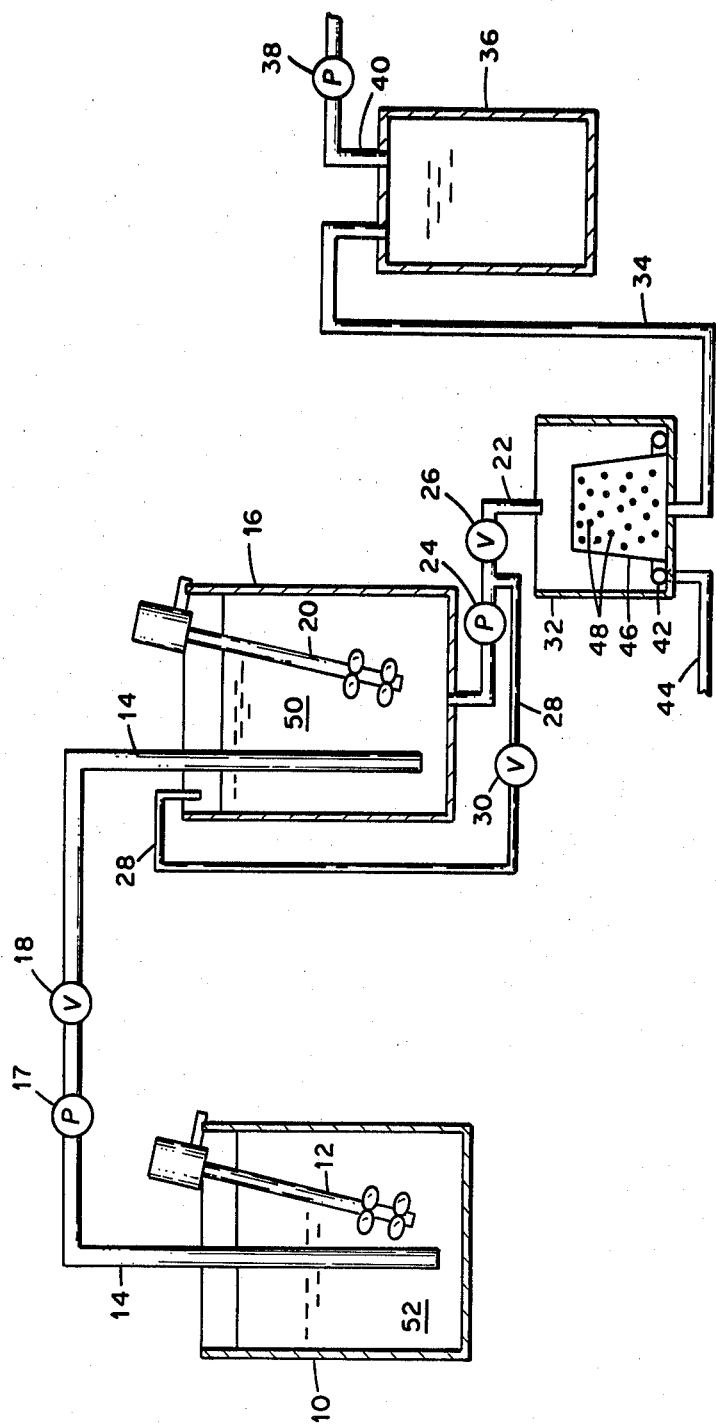

HIGH TEMPERATURE THERMAL INSULATING COMPOSITE

BACKGROUND OF THE INVENTION

This invention resulted from a contract with the United States Department of Energy and relates to a composite useful in high temperature environments. More particularly, the invention relates to a composite suitable for forming a crucible or other structure subjected to a temperature in excess of 2500° C.

U.S. Pat. No. 4,152,482, issued on May 1, 1979, to C. D. Reynolds and Z. L. Ardary, discloses a thermal insulating composite comprising three distinct layers, one of which consists of carbonized thermosetting resin and fibers formed of carbonaceous or refractory material, and the other two of which consist of the same components plus different proportions of graphite flakes, namely, 10 wt. % graphite flakes in the layer next to the layer containing no graphite flakes and 25 wt. % of graphite flakes in the third layer. The composite disclosed in the aforesaid patent is formed by depositing a layer on a perforated, vacuum-type mold, curing and carbonizing the resin in this layer, and then repeating these steps to apply subsequent layers to the first layer.

SUMMARY OF THE INVENTION

It is an object of this invention to provide a composite capable of withstanding a high temperature without melting.

Another object of the invention is to provide a composite useful for forming crucibles or heat insulation.

An additional object of the invention is to provide an improved method for forming a thermal insulating composite.

These objects and other advantages are attained by a composite having (1) a first region which extends inwardly from a first surface thereof and which includes a carbonized polymeric binder such as carbonized phenolic resin, refractory fibers, and a predetermined weight proportion of natural graphite flakes, and (2) a second region which extends from said first region toward a second surface of said composite opposed to said first surface and which includes the same carbonized polymeric binder, refractory fibers, and graphite flakes but which differs from the first region in that the weight proportion of the graphite flakes gradually decreases as distance from said first surface increases. In contrast with the method of forming the composite disclosed in U.S. Pat. No. 4,152,482, the composite of this invention is formed by (1) depositing on a suitable support, such as a suction-type mold, a mixture of a polymeric binder precursor, refractory fibers, and graphite flakes in such a way that the weight proportion of the graphite flakes varies as the mixture is being deposited, (2) polymerizing the precursor, and (3) carbonizing the polymeric binder, thus forming a unitary structure wherein refractory fibers, graphite flakes, and a binder material are bonded together.

DESCRIPTION OF THE FIGURE

The single drawing is a diagrammatic representation of a preferred apparatus for forming the composite of this invention.

DETAILED DESCRIPTION

In the drawing, reference number 10 designates a slurry tank having a rotary-type stirring means 12 located therein. A conduit 14 extends from tank 10 into the lower portion of a second tank 16 and has a pump 17 and a flow control valve 18 connected therewith, the second tank also being provided with a rotary-type stirrer 20. A conduit 22 communicates with the interior of tank 16 through a hole in the bottom thereof and has a pump 24 and a flow control valve 26 connected therewith. A recycle conduit 28 is connected to conduit 22 intermediate pump 24 and valve 26 and extends into the upper portion of tank 16, this conduit also having a flow control valve 30 associated therewith. Positioned under the outlet end of conduit 22 is a third tank 32. A vacuum conduit 34 communicates with the interior of tank 32 through a hole in the bottom thereof and extends to a water trap 36, the latter being connected to a vacuum pump 38 by a conduit 40. Disposed at the bottom of tank 32 is a tubular ring 42 having a plurality of upwardly-facing holes spaced apart from one another circumferentially thereof and connected by means of a conduit 44 to a source of pressurized water.

The composite of this invention can advantageously be used to make a crucible or like container having the shape of the mold 46 resting on the bottom of tank 32. For a reason that will become apparent hereinafter, a plurality of apertures 48 extend through the wall of mold 46 and are spaced apart from one another thereon. In the described process, mold 46 had a median diameter of 3 inches and a height of 30 inches.

In accordance with the preferred method of making a crucible the wall of which is formed of the composite of this invention, tank 16 was initially filled with 50 gallons of a slurry 50 consisting of water and a first mixture consisting by weight of 43% natural graphite flakes which passed through a 50 mesh sieve, 42% uncured phenolic resin (referred to hereinafter as the polymeric binder precursor), 10% carbon fibers having a length of 0.01 inch, and 5% carbon fibers having a length of 0.03 inch, each of said fibers having a diameter of 7 micrometers. Tank 10 was initially filled with 50 gallons of a slurry 52 consisting of water and a second mixture consisting by weight of 50% of the above-identified polymeric binder precursor, 17% carbon fibers having a length of 0.01 inch, and 33% carbon fibers having a length of 0.03 inch, each of these fibers also having a diameter of 7 micrometers.

A vacuum pressure of 20 to 26 inches of mercury is applied on the inside of the perforated mold 46 by pump 38. While slurry 50 was being stirred by stirrer 20 and pump 24 was operating, valves 26 and 30 were adjusted so that part of said slurry pumped out of tank 16 through conduit 22 was discharged into tank 32 and the remainder of the pumped slurry was recycled to tank 16 through conduit 28, the recycle flow being provided to ensure that a thoroughly mixed slurry of the components in tank 16 was supplied to tank 32. Pump 38 was simultaneously operated to create a vacuum inside mold 46, and water was discharged from the perforations in ring 42 to keep the carbon fibers and graphite flakes in the slurry discharged into tank 32 from accumulating at the bottom of the tank. Water was thus drawn through the perforations 48 in mold 46, and a layer of carbon fibers, graphite flakes, and polymeric binder precursor was deposited on the outer surface of the mold. This operating condition was maintained until about 80% of the slurry in tank 16 had been pumped therefrom and the deposit on mold 46 had reached a thickness of about 0.25 inch. Then pump 17 was operated and valve 18 opened to pump slurry 52 from tank 10 to tank 16, stirrer 12 being operated during this transfer to keep slurry 52 well mixed. The addition of slurry 52 to slurry 50 in tank 16 gradually decreased the weight proportion of graphite flakes in the mixture flowing from tank 16 to tank 32, and thus the weight proportion of graphite flakes in the mixture deposited on the initial 0.25 inch thick layer on mold 46 also gradually decreased as the thickness of the deposit increased. This operating condition was continued until the total thickness of the deposit on mold 46 was about 0.75 inch.

Next mold 46 was removed from tank 46 and the polymeric binder precursor in the deposit thereon was cured by exposure to a temperature of 130° C. for 24 hours. The container thus formed was then exposed to a temperature of 1350° C. for three hours to carbonize the polymerized binder.

A crucible formed by the above-described process includes a first region adjacent its inner surface which has a relatively high density because it consists by weight of about 43% graphite flakes, 42% carbonized phenolic resin, and 15% carbon fibers. The size of the graphite flakes (which passed through a 50 mesh sieve, as already mentioned) and the lengths and thickness of the carbon fibers of the composite provide a strong bond between these components and the carbonized phenolic resin in the inner and the outer regions of the crucible. The high density inner region reduces heat loss through the wall of the crucible resulting from radiation. Extending from the aforesaid first region of the crucible to its outer surface is a second region which contains the same carbon fibers and carbonized phenolic resin but which contains a weight proportion of graphite flakes gradually decreasing as distance from the inner surface of the crucible increases. The density of this second region is less than that of the inner region, and the second region thus provides an effective insulation for reducing heat flow through the wall of the crucible by conduction.

The composite disclosed in U.S. Pat. No. 4,152,482 consists of plural layers each separately deposited and separately heated to cure and carbonize the polymeric binder included therein. The bonds between the layers of this type of composite tend to break when the composite is exposed to a very high temperature. A composite formed in accordance with this invention has a unitary structure with no layers that can separate. When a crucible formed as described was exposed to a temperature in excess of 2500° C. at its inner surface, the maximum temperature measured at its outer surface was 350° C. and the structure of the crucible was maintained. An important advantage of the disclosed process for gradually varying the weight proportion of graphite flakes across the thickness of a composite of the type described is that it provides a means for conveniently changing the thickness, density, and thermal insulating properties of a crucible or other structure exposed to a very high temperature.

It will be recognized that other means can readily be employed to form a composite in accordance with the invention. For example, a slurry containing a polymeric binder precursor and carbon fibers can be injected at a gradually varying flow rate into a pipe conducting a slurry containing constant proportions of the same binder precursor, carbon fibers, and graphite flakes to a series of nozzles which deposit the obtained mixture onto a suitable support. Also in some composites, silica fibers can be used instead of carbon fibers.

What is claimed is:

1. A composite comprising:
   a first region extending inwardly from a first surface of said composite and comprising a carbonized polymeric binder, fibers formed of a refractory material, and a predetermined weight proportion of graphite flakes; and
   a second region extending from said first region toward a second surface of said composite opposed to said first surface and comprising a carbonized polymeric binder, fibers formed of a refractory material, and graphite flakes the weight proportion of which gradually decreases as distance from said first surface increases.

2. The composite of claim 1 wherein said fibers are formed of a refractory material selected from the group consisting of carbon and silica.

3. The composite of claim 1 wherein said graphite flakes are sized to pass through a 50 mesh sieve.

4. The composite of claim 1 wherein said polymeric binder is phenolic resin.

5. The composite of claim 1 wherein said first region comprises by weight about 42% carbonized phenolic resin, about 15% carbon fibers, and about 43% graphite flakes.

6. The composite of claim 2 wherein said first region comprises by weight about 10% carbon fibers having a diameter in the range of about 7 micrometers and a length of about 0.01 inch, and about 5% carbon fibers having a diameter in the range of about 7 micrometers and a length of about 0.03 inch.

7. A method for forming a thermal insulating composite, comprising:
   depositing on a support a slurry comprising a mixture of a polymeric binder precursor, refractory fibers, and graphite flakes, the weight proportion of said graphite flakes in said slurry being varied as the slurry is deposited on said support;
   polymerizing said polymeric binder precursor in said slurry deposited on said support; and
   carbonizing the polymerized polymeric binder.

* * * * *